(12) United States Patent
Schroeder et al.

(10) Patent No.: US 11,835,488 B1
(45) Date of Patent: Dec. 5, 2023

(54) AUTOMATIC FLOORING TYPE DETECTOR

(71) Applicant: UIPCO, LLC, San Antonio, TX (US)

(72) Inventors: Eric David Schroeder, San Antonio, TX (US); Donnette Moncrief Brown, San Antonio, TX (US); Manfred Amann, San Antonio, TX (US); Bobby Lawrence Mohs, San Antonio, TX (US); Robert Wiseman Simpson, Fair Oaks Ranch, TX (US); Meredith Beveridge Lecocke, San Antonio, TX (US); Margaret Emily Gray, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 848 days.

(21) Appl. No.: 16/587,167

(22) Filed: Sep. 30, 2019

(51) Int. Cl.
*G01N 29/44* (2006.01)
*G01N 29/04* (2006.01)

(52) U.S. Cl.
CPC ........ *G01N 29/4418* (2013.01); *G01N 29/04* (2013.01); *G01N 29/4463* (2013.01)

(58) Field of Classification Search
CPC . G01N 29/4418; G01N 29/04; G01N 29/4463
See application file for complete search history.

(56) References Cited

U.S. PATENT DOCUMENTS

| | | | |
|---|---|---|---|
| 2010/0161253 A1* | 6/2010 | Allan | G01N 33/34 702/56 |
| 2017/0074830 A1* | 3/2017 | Bellotti | G01N 29/11 |
| 2019/0293609 A1* | 9/2019 | Oh | G01N 29/348 |
| 2022/0128514 A1* | 4/2022 | Salloum | G01H 11/08 |
| 2022/0280005 A1* | 9/2022 | Lai | A47L 9/2826 |

* cited by examiner

*Primary Examiner* — Xin Y Zhong
(74) *Attorney, Agent, or Firm* — Plumsea Law Group, LLC

(57) ABSTRACT

An acoustic apparatus and method of determining the composition of a floor, based on the filtered sound waves produced by vibrating the floor is disclosed. The apparatus includes a transducer for generating vibrations and/or sound, as well as microphones for detecting sounds. The apparatus may include two microphones so that ambient noise can be removed from an audio signal.

15 Claims, 14 Drawing Sheets

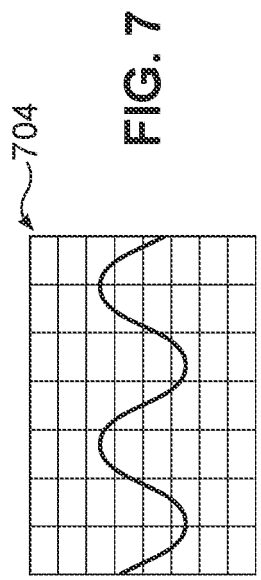
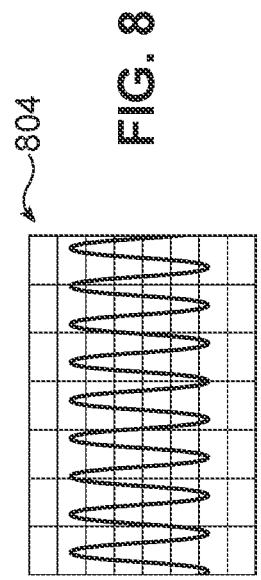
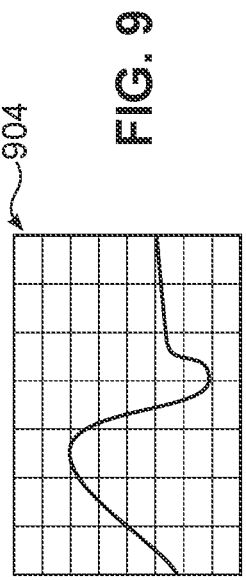
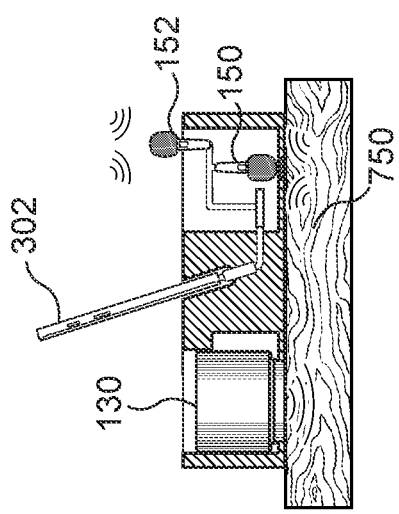
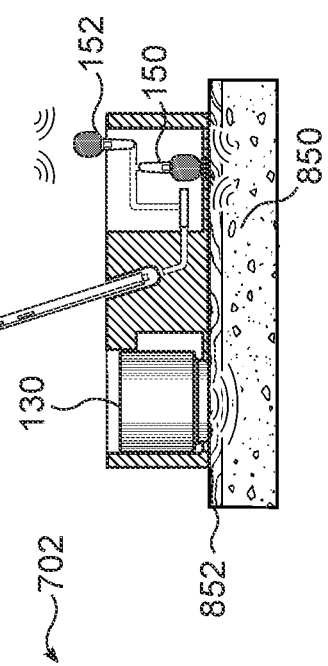
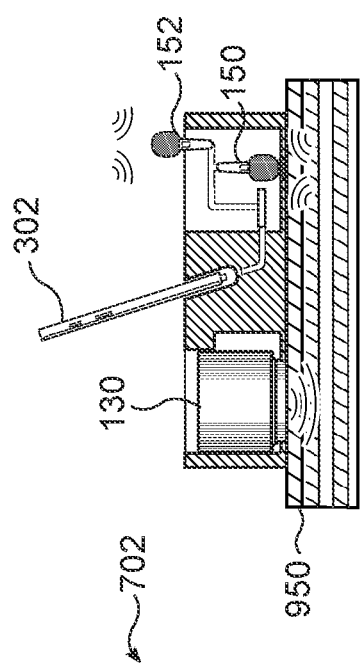
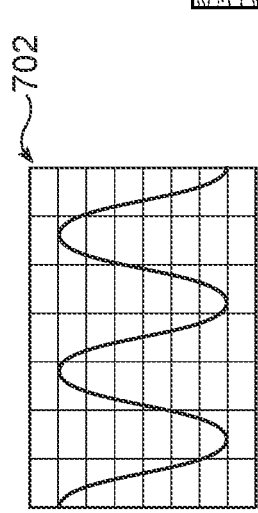
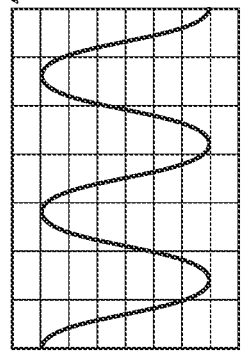
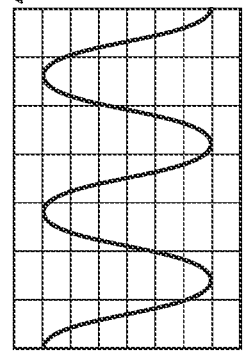

AUTOMATIC FLOORING TYPE DETECTOR

TECHNICAL FIELD

The present disclosure generally relates to floors, and in particular to systems and methods for determining the composition of floors.

BACKGROUND

Property adjusters for insurance companies currently have difficulty identifying different types of flooring. For example, based on visual inspection of a wooden floor, a property adjuster may not be able to determine what type of wood is used in the wooden floor. It may be unclear if the wooden floor is a hardwood floor or a laminate floor. Being able to determine the type of material used in a floor is important, because the difference in cost between floors made of different types of wood and the difference in cost between a hardwood floor and a laminate floor can be considerable. As a result of a property adjuster being unable to determine the composition of a wooden floor that needs to be replaced after the floor has been damaged by fire, water, etc., an insurance company may underpay or overpay insurance claims for the damage to wood floors. In one current method for determining the type of wood floor for an insurance claim, a sample is cut out of the wood floor and is sent away to be analyzed in a laboratory where the sample is compared against existing laboratory samples. However, such a process can be slow and expensive.

There is a need in the art for a system and method that addresses the shortcomings discussed above.

SUMMARY

In one aspect, an acoustic apparatus includes a housing portion including an upper portion and a lower portion, a transducer mounted adjacent the bottom portion, a first microphone mounted adjacent the bottom portion, a second microphone mounted to the housing portion at a location disposed away from the first microphone, and an electrical connector configured to be connected to a computing device. The electrical connector is electrically connected to the first microphone and to the second microphone. When the device is placed against a floor and the transducer is activated, the transducer generates sounds in the floor that can be detected by the first microphone.

In another aspect, an acoustic apparatus includes an enclosure having a body portion, one or more side walls extending from the body portion, and an open side surrounded by the one more walls. The apparatus also includes a microphone mounted in the body portion of the enclosure for receiving filtered sound waves from a portion of a floor when the floor on which the enclosure is placed is vibrated. Each of the one or more side walls has a free end. Together the free ends of the one or more side walls form a distal perimeter edge of the enclosure. When the open side of the enclosure is placed on the portion of the floor, the body portion and one or more walls of the enclosure and the portion of the floor form a hollow enclosed region.

In another aspect, a method for determining a flooring type for a portion of a floor includes steps of using a transducer to generate an initial sound at the portion of the floor, detecting a first observed sound at a first microphone and transmitting a first audio signal corresponding to the first observed sound to a signal processing module, detecting a second observed sound at a second microphone and transmitting a second audio signal corresponding to the second observed sound to the signal processing module, using the signal processing module to subtract the second audio signal from the first audio signal and thereby generating a filtered audio signal, analyzing the filtered audio signal to determine the flooring type of the floor, and displaying the flooring type to a user.

Other systems, methods, features, and advantages of the disclosure will be, or will become, apparent to one of ordinary skill in the art on examination of the following figures and detailed description, It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed on illustrating the principles of the invention. Moreover, in the figures, like reference numerals designate corresponding parts throughout the different views.

FIGS. 7-9 are schematic views depicting the operation of an acoustic apparatus on different flooring types, according to an embodiment;

DESCRIPTION OF EMBODIMENTS

The embodiments provide a system and method for automatically detecting a type of floor in a structure. The type of floor, also referred to throughout as the "flooring type", refers to the materials and/or structural features of the floor. Examples of different flooring types include, but are not limited to: hardwood flooring, engineered wood flooring, bamboo flooring, laminate flooring, linoleum flooring, cork flooring, ceramic tile flooring, vinyl flooring, stone flooring, concrete flooring, and carpet. While some flooring types can be easily distinguished by visual inspection, such as the distinction between a concrete floor and a hardwood floor, other types may not be easily discernible by inspection. For example, it may be difficult to know if a given floor is a solid hardwood floor, an engineered wood floor, or a laminate floor. In other cases, a floor may comprise a concrete base that is covered by a layer of wood.

The exemplary system comprises an acoustic apparatus that can be placed against a flooring surface to determine the flooring type. The acoustic apparatus can generate sounds using a built-in transducer. Sound waves emanating from the device are filtered through the floor and the resulting filtered sound waves are detected by a microphone disposed adjacent the floor and within the acoustic apparatus. In addition, a second microphone is used to detect ambient noise that can be subtracted from the primary acoustic signal. Signals from both microphones are fed into a mobile computing device, such a smart phone, that can be connected to the device. The mobile computing device further comprises a signal processing module to remove the ambient noise from the primary audio signal, as well as a flooring type classifier for identifying the flooring type based on the input audio signal.

The system and method facilitate improved speed and cost over existing methods that require portions of a floor to be removed and tested in a laboratory. The system and method also facilitate improved accuracy over methods relying on visual inspection. The system and method also provide a consistent system that can be used by homeowners, inspectors, and/or insurance adjusters without the need for any training in visually identifying different flooring types. These improvements help ensure that flooring in a home is properly assessed for homeowner's insurance.

Figure 1:
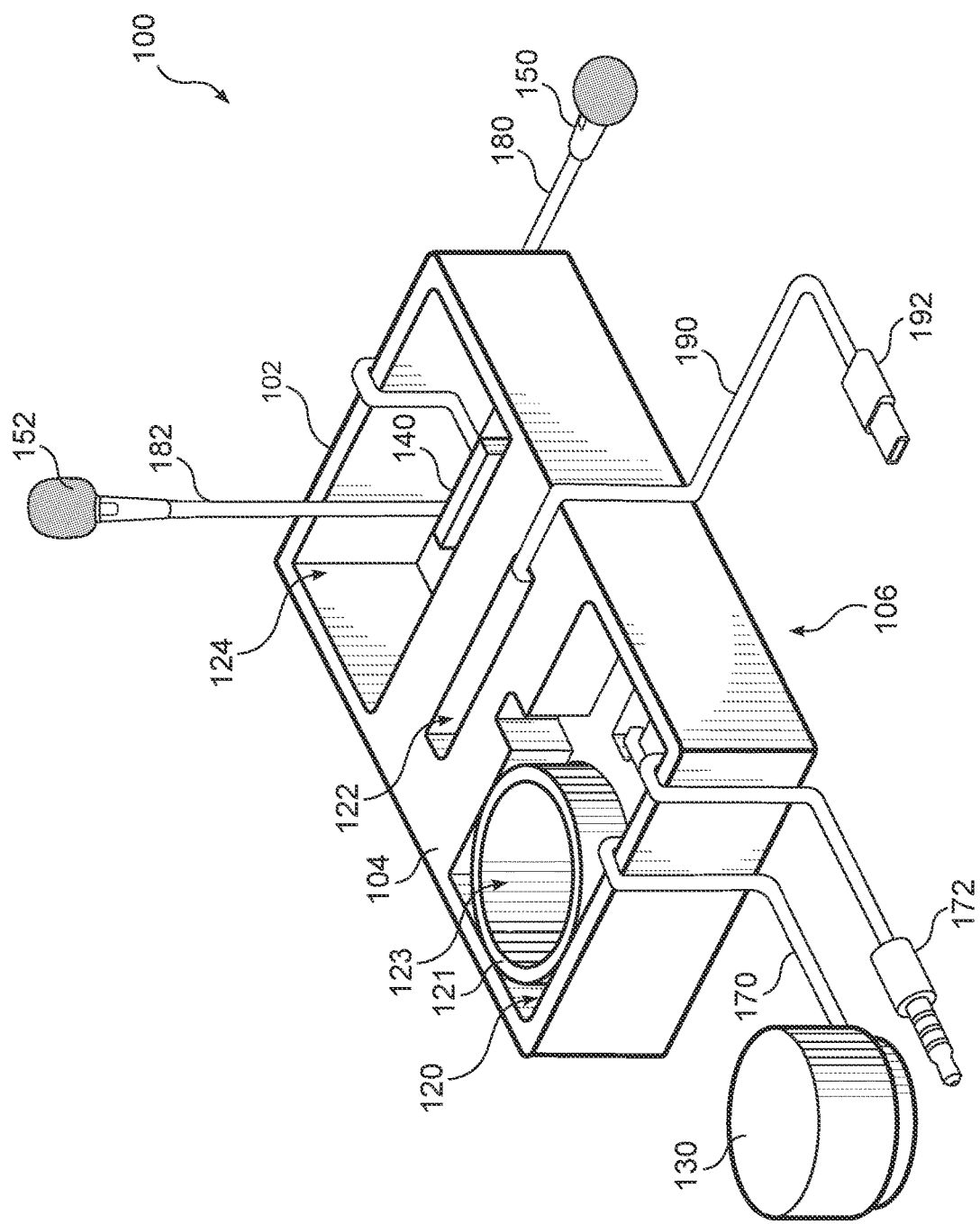
FIG. 1 is a top perspective view of an acoustic apparatus, according to an embodiment.

FIG. 1 is a schematic view of an acoustic apparatus 100, also referred to simply as apparatus 100. Specifically, in some embodiments, acoustic apparatus may function as part of a flooring type detector that can be used to detect the type of flooring present in a building (such as a home or office building). Apparatus 100 may comprise a housing 102. Housing 102 may further receive and hold a plurality of different electrical devices that can be used to generate and detect sounds.

Figure 2:
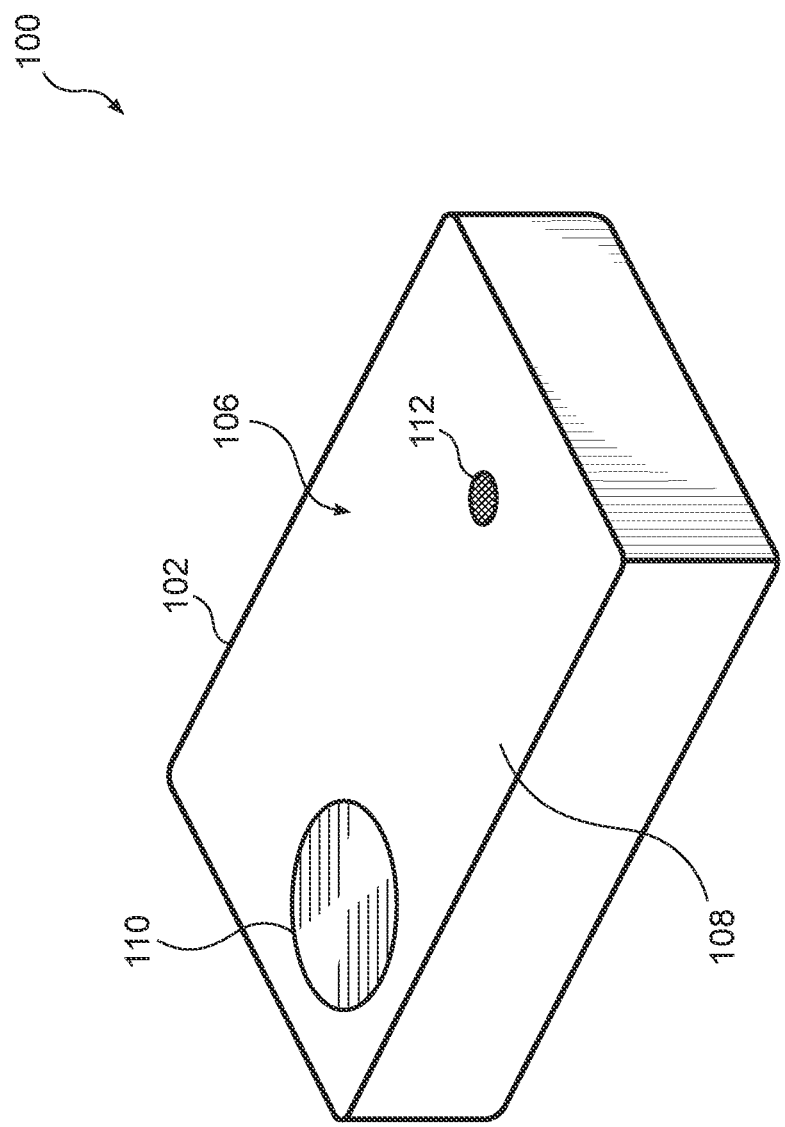
FIG. 2 is a bottom perspective view of the acoustic apparatus of FIG. 1.

Housing 102 may comprise an upper portion 104 and a lower portion 106. As used herein, the term "lower portion" refers to a portion of housing 102 that is disposed adjacent a floor when housing 102 is placed on the floor during the operation of apparatus 100. Likewise, the term "upper portion" refers to a portion of housing 102 that is disposed furthest from the floor in this same operating position. As seen in FIG. 2, lower portion 106 is comprised of a lower surface 108 interrupted by a first lower opening 110 and a second lower opening 112. By contrast, upper portion 104 has a relatively open configuration that provides access to multiple different cavities, including a first upper cavity 120, a second upper cavity 122 and a third upper cavity 124.

First upper cavity 120 may include a transducer receiving portion 121 that is shaped to receive a transducer 130. In particular, transducer receiving portion 121 may include a rounded interior wall 123 to fit the approximately cylindrical shape of transducer 130. Moreover, transducer receiving portion 121 may extend to first lower opening 110, so that a part of transducer 130 may be exposed on lower surface 108 (see FIG. 2).

Second upper cavity 122 may be configured to receive a portable computing device. Examples of portable computing devices that could be received within second upper cavity 122 include, but are not limited to, smart phones, tablet computing devices or other suitable computing devices. In one embodiment, second upper cavity 122 could receive a smart phone that can be connected to one or more electronic devices associated with apparatus 100.

Third upper cavity 124 may be configured to receive one or more circuit components 140, which are indicated schematically in FIG. 1. These circuit components may facilitate the operation of one or more electrical devices associated with apparatus 100. These can include, for example, a first microphone 150 and a second microphone 152. In some cases, circuit components 140 may include circuit elements to facilitate powering and/or receiving signals from first microphone 150 and second microphone 152.

In some embodiments, third upper cavity 124 is dimensioned to accommodate first microphone 150. Specifically, first microphone 150 may be mounted within third upper cavity 124. In some cases, first microphone 150 may be mounted so that a portion of first microphone 150 is exposed through second lower opening 112 (see FIG. 2).

In operation, second microphone 152 may be mounted to housing 102 in a location that is separated from first microphone 150. For example, in some cases, second microphone 152 may be mounted closer to upper portion 104 of housing 102, while first microphone 150 is mounted to lower portion 106, Moreover, in some cases, first microphone 150 and second microphone 152 may be oriented in different directions. Specifically, first microphone 150 may be oriented to primarily pick up sounds coming from the floor, while second microphone 152 may be oriented to primarily pick up ambient sounds (that is sounds not emanating from the floor) while the apparatus is in use. Thus, in some cases, first microphone 150 may be oriented down towards a floor, while second microphone 152 may be oriented up or otherwise away from the floor, while the device is in operation.

For purposes of illustration, first microphone 150 and second microphone 152 are shown schematically. The embodiments may incorporate any kinds of microphones known in the art. These include, but are not limited to: condenser microphones, electret condenser microphones, dynamic microphones, ribbon microphone, contact microphone, as well as any other suitable kinds of microphones.

Apparatus 100 can incorporate provisions for connecting the different electrical devices to external components and/or to one another. As seen in FIG. 1, wires 170 can be used to deliver a signal to transducer 130. In some embodiments, wires 170 are connected to an audio connector 172 that can be plugged into the audio output port of any suitable device, such as a radio, mobile phone, MP3 player or other device capable of generating an audio signal. In addition, wires 180 and wires 182 can be used to connect first microphone 150 and second microphone 152, respectively, to circuit components 140. That is, audio information detected by the microphones can be passed to circuit components for processing and/or for relaying those signals to another device. Wires 190 can be used to connect circuit components 140 with a portable computing device, such as a smart phone. In some embodiments, a smart phone connector 192 can be used to connect to a corresponding port in a smart phone. In one embodiment, connector 192 may be a lightning connector. In other embodiments, connector 192 could be a micro-USB connector.

Figure 3:
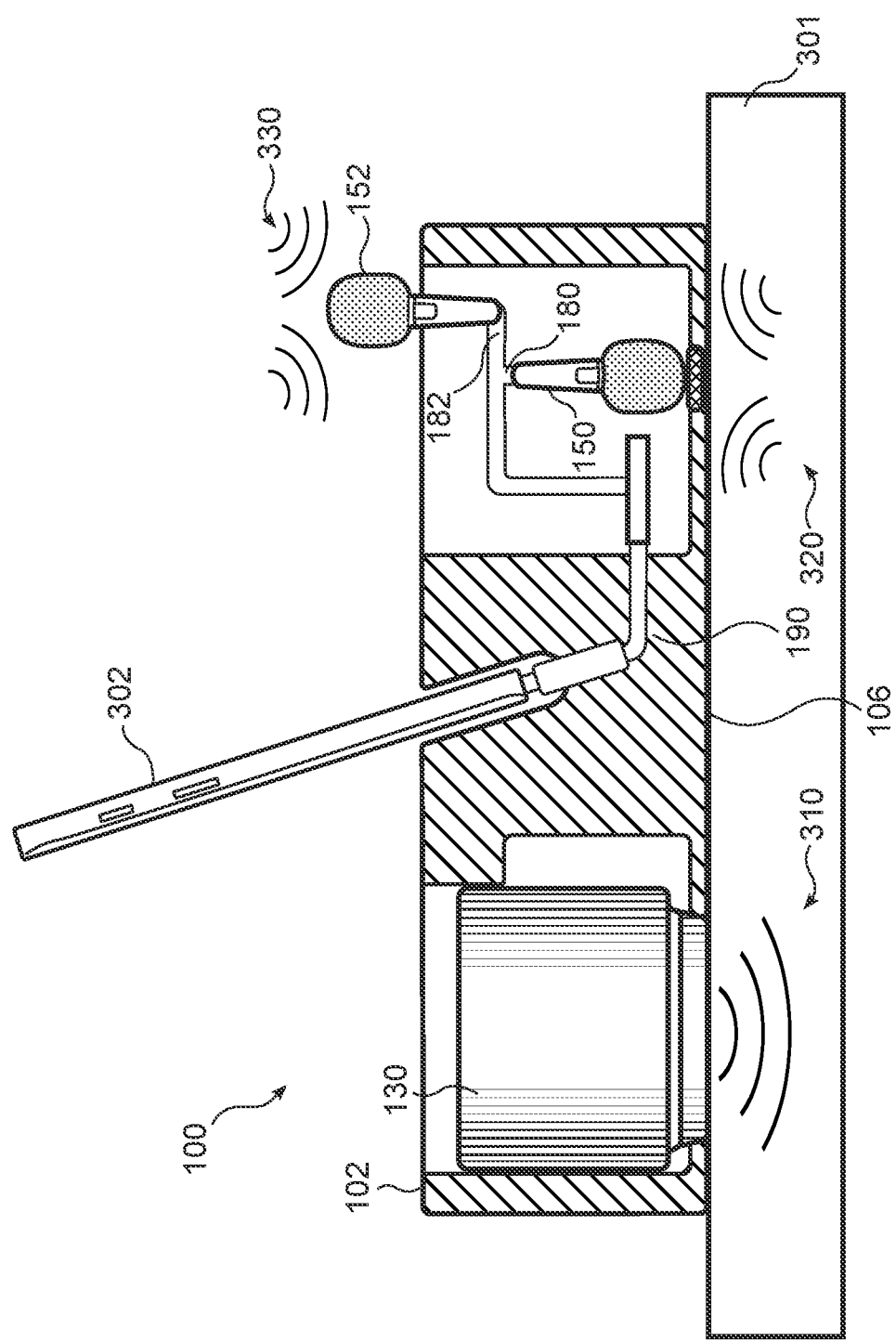
FIG. 3 is a schematic side cross-sectional view of the acoustic apparatus of FIG. 1, according to an embodiment.

FIG. 3 is a schematic view of apparatus 100 in operation with a portion of a generic floor 301, according to an embodiment. In this embodiment, housing 102 is shown in cross-section in order to clarify the operation of several internal components. Specifically, transducer 130, first microphone 150 and second microphone 152 are all visible within housing 102. Additionally, a portion of a smart phone 302 that would otherwise be concealed by housing 102 is also visible. When assembled with a smart phone 302, acoustic apparatus 100 and smart phone 302 may be collectively referred to as a flooring type detection system.

Figure 15:
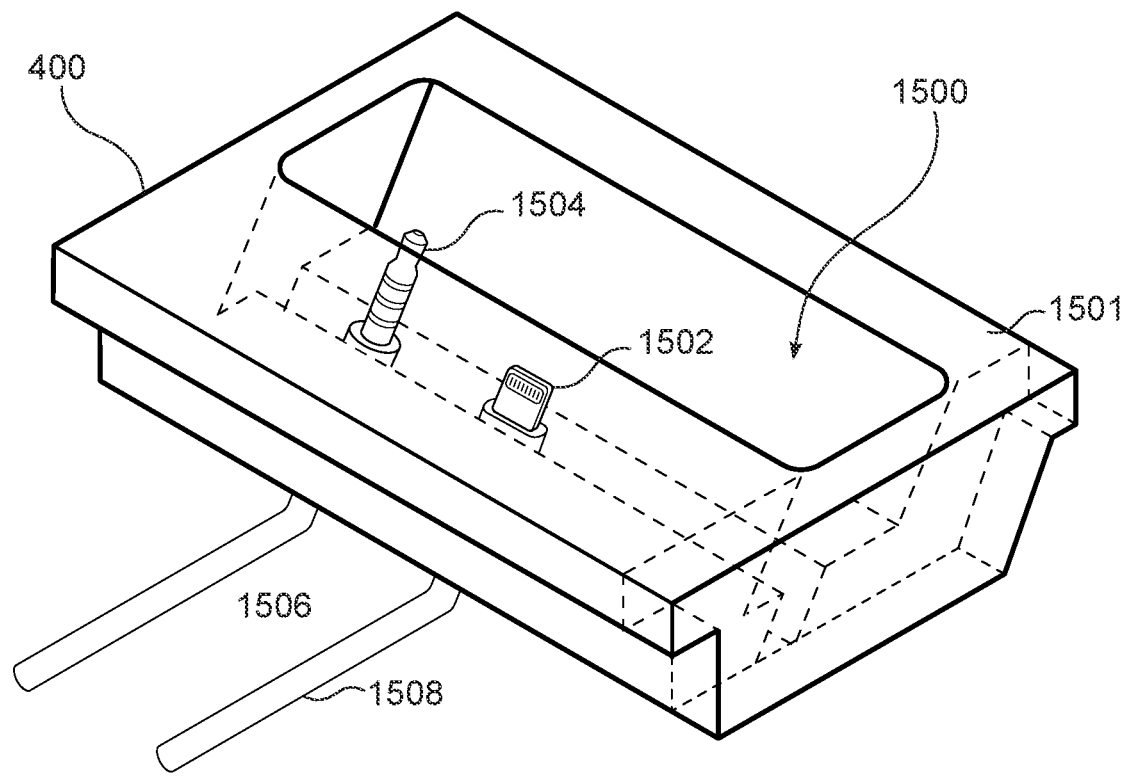
FIG. 15 is a schematic view of a portion of a housing of an acoustic apparatus, according to an embodiment.

As seen in FIG. 3, wires 190 are connected to smart phone 302. This allows smart phone 302 to receive audio signals (and/or other information) from first microphone 150 and second microphone 152 through wires 180 and wires 182, respectively. Additionally, transducer 130 may be connected to either smartphone 302 or an external audio source using wires 170 and audio jack 172 (see FIG. 1). In embodiments where smartphone 302 is used to drive transducer 130, incoming and outgoing signals could be transmitted via connector 192 and wires 190. Alternatively, both audio jack 172 and connector 192 could be connected to smartphone 302. For example, FIG. 15 shows another embodiment where a connector 1502 and an audio jack 1504 are integrated into an upper cavity 1500 of a portion of housing 1501 of another embodiment of an acoustic apparatus 400. Connector 1502 can receive audio signals from microphones and/or other circuit components via wires 1508, Connector 1502 could be any known connector, such as a lightning connector, a micro-USB connector, or any other suitable connector. Audio jack 1504 may be connected to a transducer to drive the transducer.

In operation, smartphone 302 generates an audio signal that is sent o transducer 130. Transducer 130 converts the electrical signal from an audio source (such as smartphone 302 or an external audio source) into vibrations that generate sound waves 310, In some cases, transducer 130 may actually vibrate lower portion 106, which shakes and generates sound waves 310. In other cases, the sound waves are primarily generated at transducer 130 itself.

These sound waves 310 travel through floor 301. The material comprising floor 301 acts to filter sound waves 310, thereby generating filtered sound waves 320 that may be detected by first microphone 150. At the same time that first microphone 150 is detecting filtered sound waves 320, second microphone 152 is detecting ambient sound waves 330 (that is, ambient noise). Audio signals associated with both the filtered sound waves 320 and the ambient sound waves 330 are then received at smart phone 302 and processed as described in further detail below.

Figure 4:
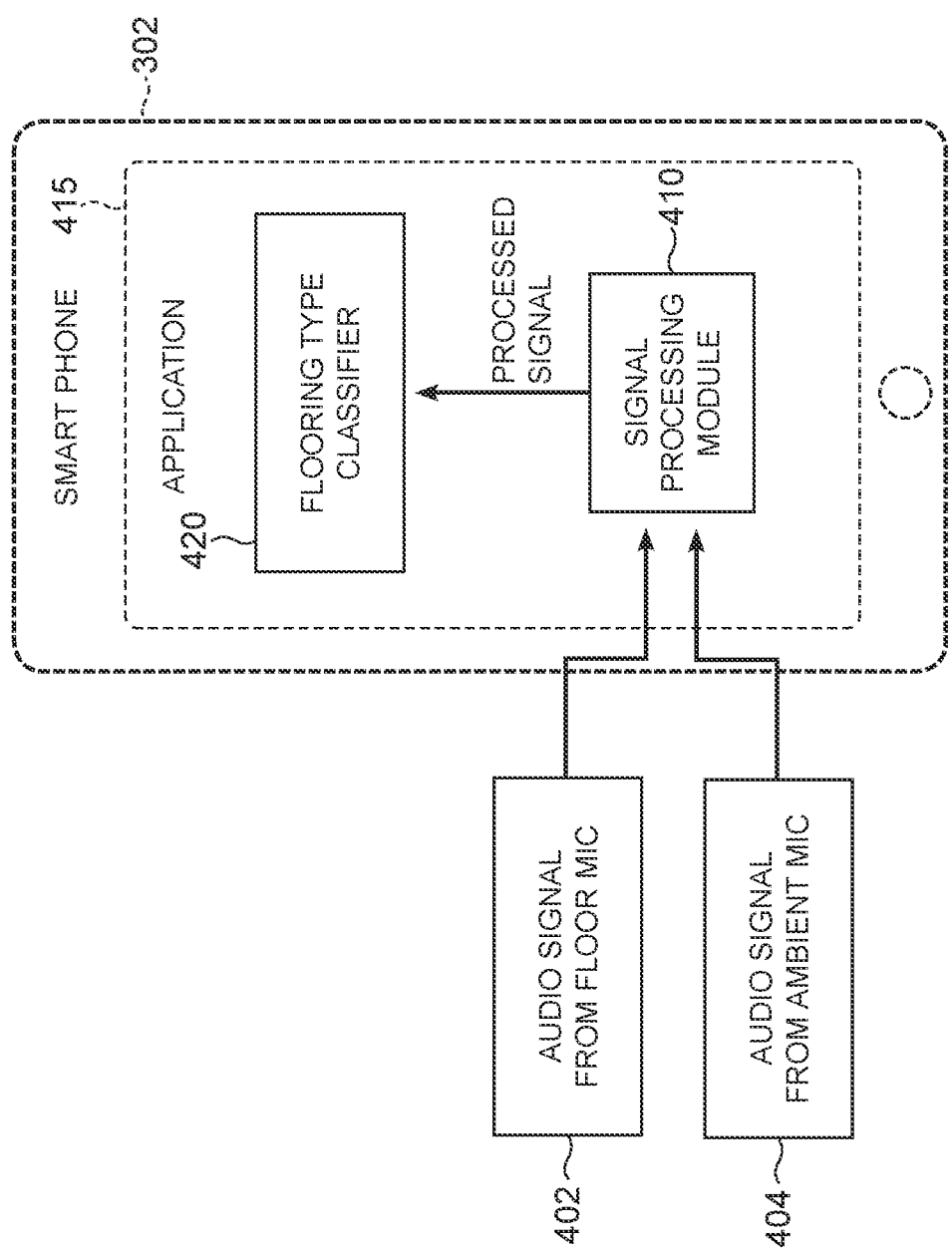
FIG. 4 is a schematic view of components used in determining a flooring type, according to one embodiment.

FIG. 4 is a schematic view indicating how information generated by apparatus 100 may be processed within a flooring type detection system, In this example, audio signals may be processed by software modules disposed in a smart phone (such as smart phone 302) or any other computing device that is connected to apparatus 100 during operation. In other embodiments, however, one or more processing modules could be incorporated into other components associated with apparatus 100. These could include separate circuit boards or other integrated processing devices.

As seen in FIG. 4, a first audio signal 402 associated with the floor microphone (for example, first microphone 150) and a second audio signal 404 associated with the ambient noise microphone (for example, second microphone 152) are fed into a signal processing module 410. In some embodiments, signal processing module 410 could be a software module configured to run within an application 415 on smart phone 302. The processed signal generated by signal processing module 410 is then fed into a flooring type classifier 420. In some embodiments, flooring type classifier 420 may be configured to run within an application on smart phone 302. Alternatively, one or both of signal processing module 410 and flooring type classifier 420 could run on a remote server or cloud service, which may be accessed by smart phone 302 over a network such as the Internet.

Figure 5:
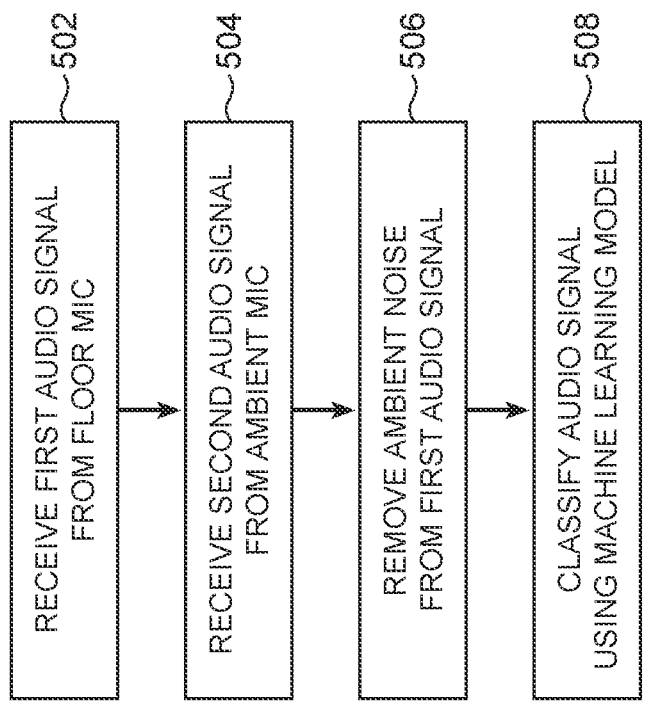
FIG. 5 is a schematic view of a process for removing ambient noise from an audio signal and classifying the filtered audio signal.

FIG. 5 is a schematic view of how audio information is processed in order to classify a signal. It may be appreciated that in some embodiments one or more of these steps could be performed by an application running on a smart phone. Starting in step 502, a signal processing module may receive a first audio signal from a floor microphone. That is, the first audio signal includes sound information received while the apparatus is operated. In step 504, which may occur simultaneously with step 502, the signal processing module may receive a second audio signal from an ambient microphone. That is, the second audio signal includes ambient sound that is present while the apparatus is operated. Next, in step 506, the signal processing module may remove the ambient noise from the first audio signal. In some cases, this step may comprise subtracting the second audio signal from the first audio signal. In other cases, any suitable algorithm for filtering out one signal from another could be used. Finally, in step 508, a flooring type classifier may classify the audio signal that has been processed in step 506 using a machine learning model.

Figure 6:
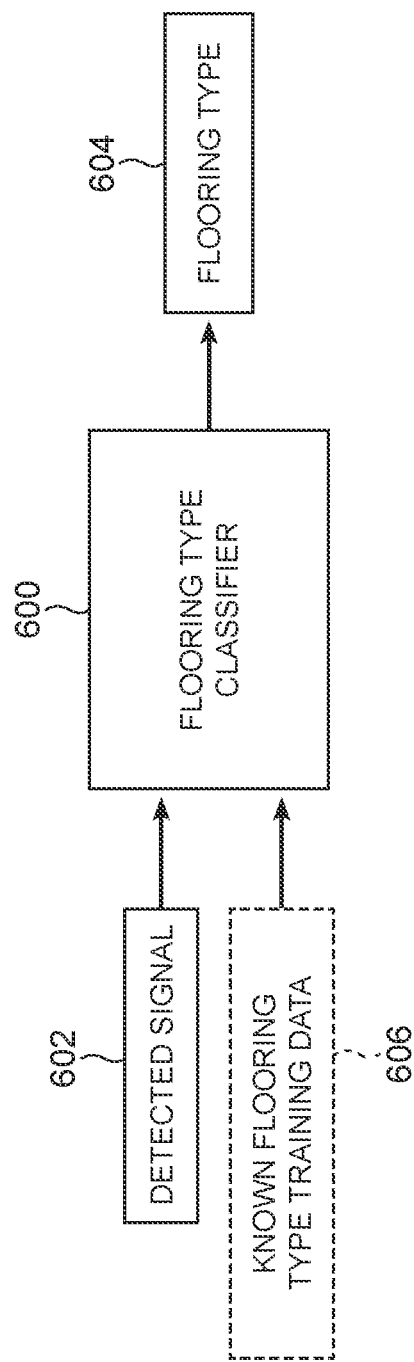
FIG. 6 is a schematic view of a flooring type classifier, including inputs and outputs, according to an embodiment.

FIG. 6 is a schematic view of a flooring type classifier 600, as well as possible inputs and outputs. Flooring type classifier 600 may include any suitable machine learning algorithms. Exemplary machine learning algorithms that may be used include, but are not limited to: supervised learning algorithms and unsupervised learning algorithms. In some embodiments, a decision tree could be used. In some embodiments, a random forest model could be used. In another embodiment, a clustering algorithm could be used. In still other embodiments, a neural network could be used. In still other embodiments, a regression model could be used.

Flooring type classifier 600 may receive a detected signal 602 as input and generate a flooring type 604 as output. When the system is being trained, known flooring type training data 606 for each detected signal could also be provided as input.

FIGS. 7-9 depict schematic views of output signals for three different flooring types. It may be appreciated that the particular audio signals shown in these figures are simplified for clarity. In each of these figures, apparatus 100 is disposed against a portion of a floor and operated to detect the flooring type. Specifically, transducer 130 is driven to generate sounds that vibrate the adjacent floor, and first microphone 150 and second microphone 152 are used to detect the resulting filtered sound waves along with ambient noise. Then, the signals are processed by smart phone 302 as described above.

As shown in FIG. 7, upon driving transducer 130 according to an input audio signal 702, a first type of flooring 750 generates sound waves corresponding to a first processed audio signal 704. As shown in FIG. 8, when the same input signal 702 is used to drive transducer 130, a second type of flooring 850 generates sound waves corresponding to a second processed audio signal 804. As seen by comparing FIGS. 7 and 8, second processed audio signal 804 is substantially distinct from first processed audio signal 704. As shown in FIG. 9, when the same input signal 702 is used to drive transducer 130, a third type of flooring 950 generates sound waves corresponding to a third processed audio signal 904. As seen by comparing FIGS. 7, 8, and 9, third processed audio signal 904 is substantially distinct from both first processed audio signal 704 and second processed audio signal 804. Thus, the fact that each flooring type is associated with a different characteristic output signal, makes it possible for a flooring type classifier to identify the flooring type according to the output signal, For example, based on the processed audio signal 704, a flooring type detector may identify the first type of flooring 750 as hardwood. Based on the processed audio signal 804, a flooring type detector may identify the second type of flooring 850 as a concrete floor with a wood panel covering 852, Based on the processed audio signal 904, a flooring type detector may identify the third type of flooring 950 as a laminate floor.

In other embodiments, an acoustic apparatus may not include a separate transducer. Instead, the acoustic apparatus could utilize speakers in a smartphone or similar device.

Figure 10:
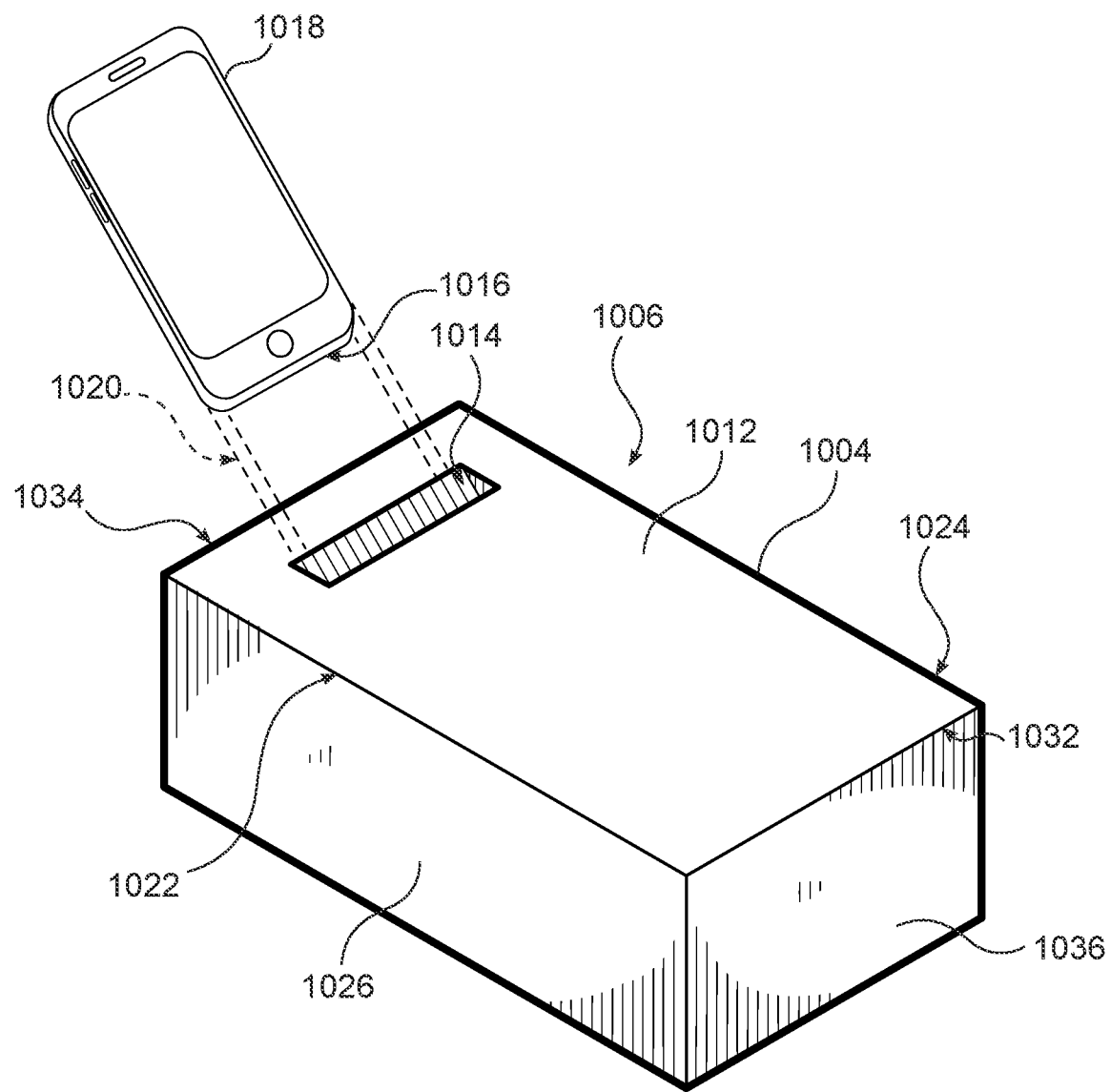
FIG. 10 is a schematic view of another embodiment of an acoustic apparatus.
Figure 11:
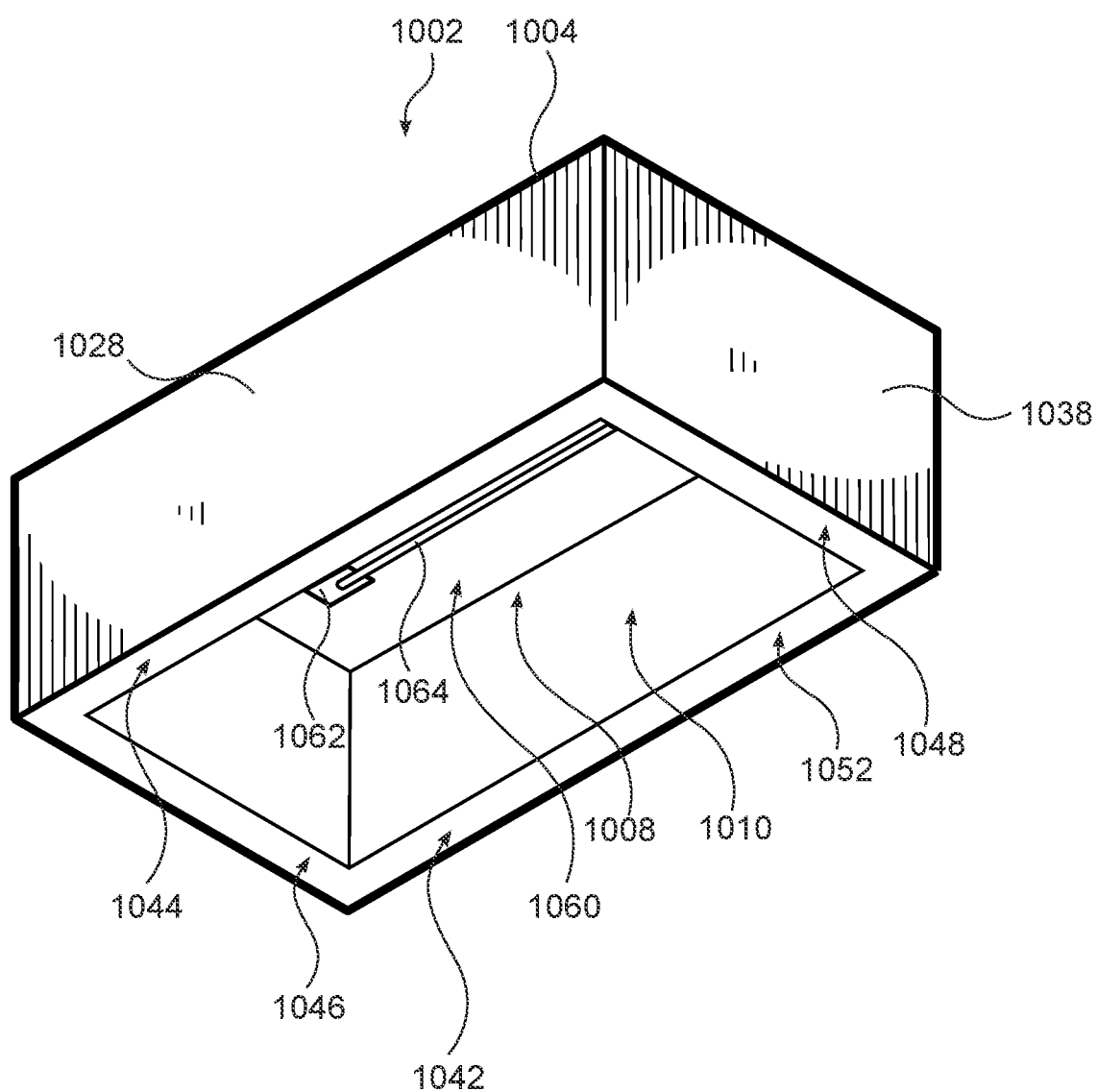
FIG. 11 is a schematic bottom perspective view of the acoustic apparatus of FIG. 10.

FIGS. 10-13 illustrate views of another embodiment of an acoustic apparatus that may be used as a flooring type detector. In particular, FIGS. 10 and 11 show an acoustic apparatus 1002 according to one embodiment of the present invention having an enclosure 1004 that has a rectangular box shape. FIG. 10 shows an exterior 1006 of enclosure 1004 and FIG. 11 shows an interior 1008 and an open side 1010 of enclosure 1004.

As shown in FIG. 10, enclosure 1004 has a body portion 1012 including recess 1014 for receiving an end 1016 of a smartphone 1018 at a slanted angle, indicated by dashed lines 1020. Extending from long side 1022 and long side 1024 of body portion 1012 are long side wall 1026 and long side wall 1028, respectively. Extending from short side wall 1032 and short side wall 1034 of body portion 1012 are short side wall 1036 and short side wall 1038, respectively. As shown in FIG. 11, free end 1042 and free end 1044 of long side wall 1026 and long side wall 1028, respectively and free end 1046 and free end 1048 of short side wall 1036 and short side wall 1038, respectively, together form a distal perimeter edge 1052 of enclosure 1004. Distal perimeter edge 1052 surrounds open side 1010 of enclosure 1004. As shown in FIG. 11, body portion 1012 has an interior surface 1060 on which is mounted a microphone 1062 (see FIG. 12) and an electrical connection 1064. Electrical connection 1064 electrically connects microphone 1062 to an electrical connector (not shown in FIGS. 10 and 11) in recess 1014. When smartphone 1018 is inserted in recess 1014, an electrical connector (not shown in FIGS. 10 and 11) at end 1016 electrically connects to the electrical connector in recess 1014 to thereby put microphone 1062 in electronic communication with smartphone 1018.

Figure 12:
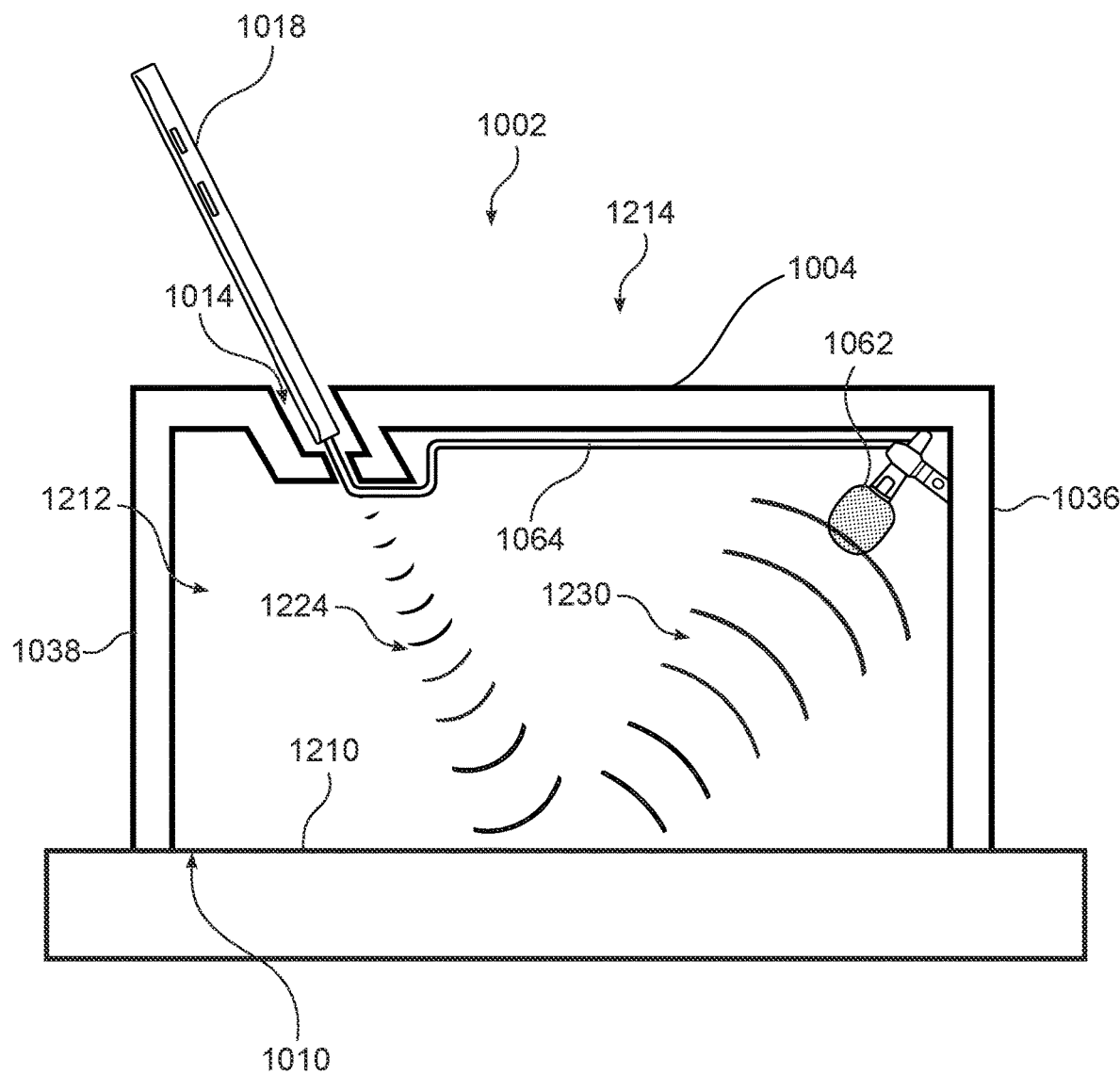
FIG. 12 is a schematic side view depicting the operation of the acoustic apparatus of FIG. 10.

FIG. 12 shows how acoustic apparatus 1002 can be used to determine the composition of floor 1210. Open side 1010 of enclosure 1004 of acoustic apparatus 1002 is placed on floor 1210 to produce an enclosed region 1212 formed by enclosure 1004 and floor 1210. In one embodiment of the present invention, enclosed region 1212 is acoustically isolated from environment 1214 outside enclosed region 1212. A speaker (not shown in FIG. 12) of smartphone 1018 mounted in recess 1014 emits emitted sound waves 1224 of various frequencies through opening 1222 in a bottom side 1226 of recess 1014. Emitted sound waves 1224 vibrate floor 1210 thereby causing floor 1210 to vibrate and filter emitted sound waves 1224. This results in the production of filtered sound waves 1230 that are received by microphone 1062. The type of material floor 1210 is made of will affect the filtered sound waves that are produced by floor 1210 in response to emitted sound waves 1224. For example, softer materials used in floor 1210 will tend to better transmit lower frequency sound waves from emitted sound waves 1224 in filtered sound waves 1230. Conversely, harder material used in floor 1210 will tend to better transmit higher frequency sound waves from emitted sound waves 1224 in filtered sound waves 1230. Microphone 1062 sends information about filtered sound waves 1230 to smartphone 1018 through electrical connection 1064 (not shown in FIG. 12). Based on stored sound wave profile information about different types of flooring materials in the memory of smartphone 1018, the amplitude of each frequency in emitted sound waves 1224 and the amplitude of each frequency in filtered sound waves 1230, hardware and/or software in smartphone 1018 determines the composition of floor 1210.

Although in the embodiment of the present invention shown in FIG. 12, the smartphone used to produce the emitted sounds waves is used to determine the type of material or materials used in the flooring, in other embodiments of the present invention, the microphone may be connected to another electronic device such as another smartphone, tablet-type device, laptop, etc. that is used to determine the type of material or materials used in the flooring being analyzed by the acoustic apparatus.

Figure 13:
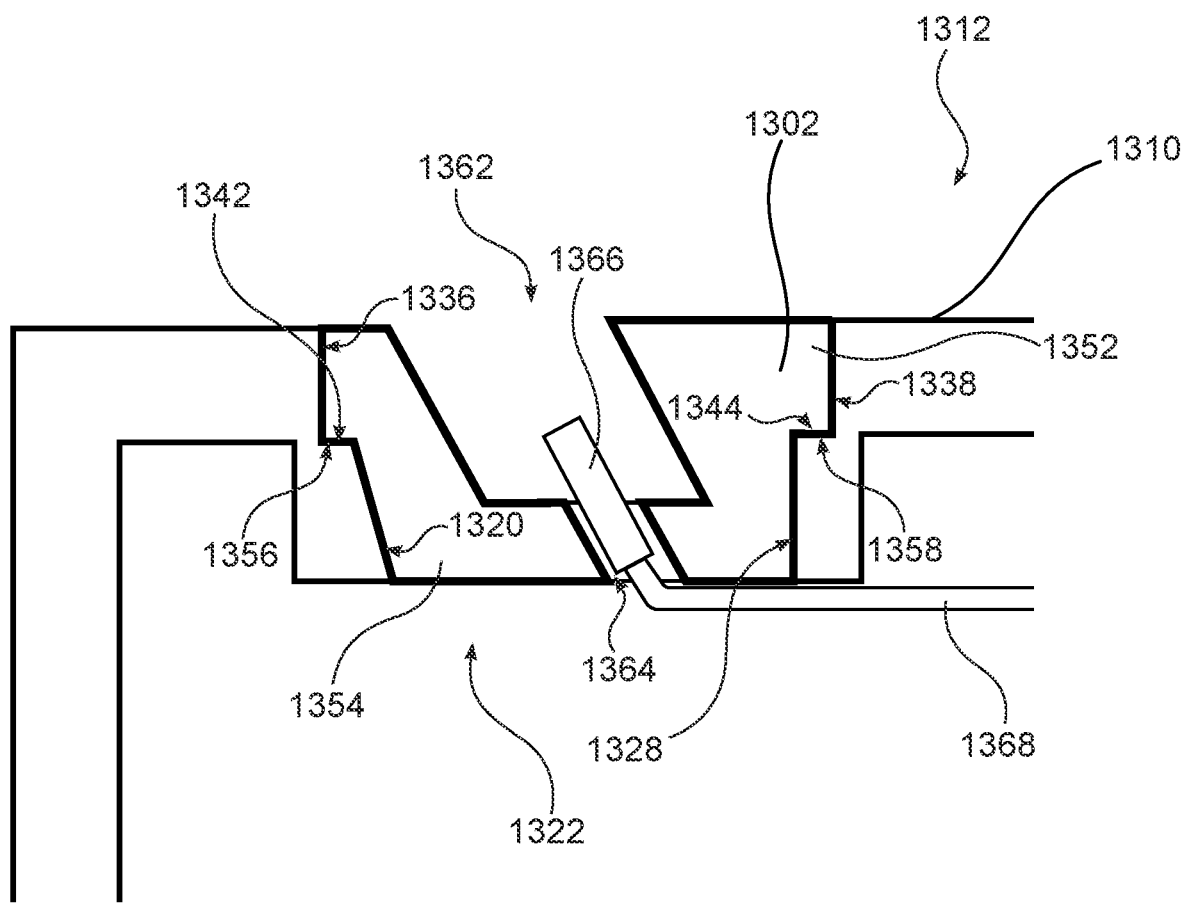
FIG. 13 is a schematic view of a portion of an acoustic apparatus, according to an embodiment.

FIG. 13 shows an insert 1302 for mounting a smartphone (not shown in FIG. 13) in a body portion 1310 of an acoustic apparatus 1312 according to one embodiment of the present invention. Insert 1302 is inserted in an opening 1322 of body portion 1310. Opening 1322 includes with a slanted wall 1326 and a vertical wall 1328. Opening 1322 also includes a vertical wall 1336 and a vertical wall 1338. Opening 1322 includes a ledge 1342 where vertical wall 1336 is joined to slanted wall 1326 and a ledge 1344 where vertical wall 1338 is joined to vertical wall 1328. Insert 1302 includes a top portion 1352 and a narrower bottom portion 1354 shaped so that when insert 1302 is inserted into opening 1322, insert 1302 mates with opening 1322. As shown in FIG. 13, when insert 1302 is inserted in opening 1322, a lower ledge 1356 of top portion 1352 abuts ledge 1342 of opening 1322 and a lower ledge 1358 of top portion 1352 abuts ledge 1344 of opening 1322. Insert 1302 includes a recess 1362 for receiving an end of a smartphone (not shown in FIG. 13). Extending through a slanted opening 1364 in bottom portion 1354 of insert 1302 is an electrical connector 1366 for connecting to an electrical connector (not shown in FIG. 13)

of a smartphone inserted in recess 1362. Electrical connector 1366 is connected to a microphone (not shown) by an electrical connection 1368.

In another embodiment, an acoustic apparatus could incorporate a transducer, but not a separate microphone. Instead, the microphone of a smartphone operable with the acoustic apparatus could be used to detect sound waves generated by a floor.

Figure 14:
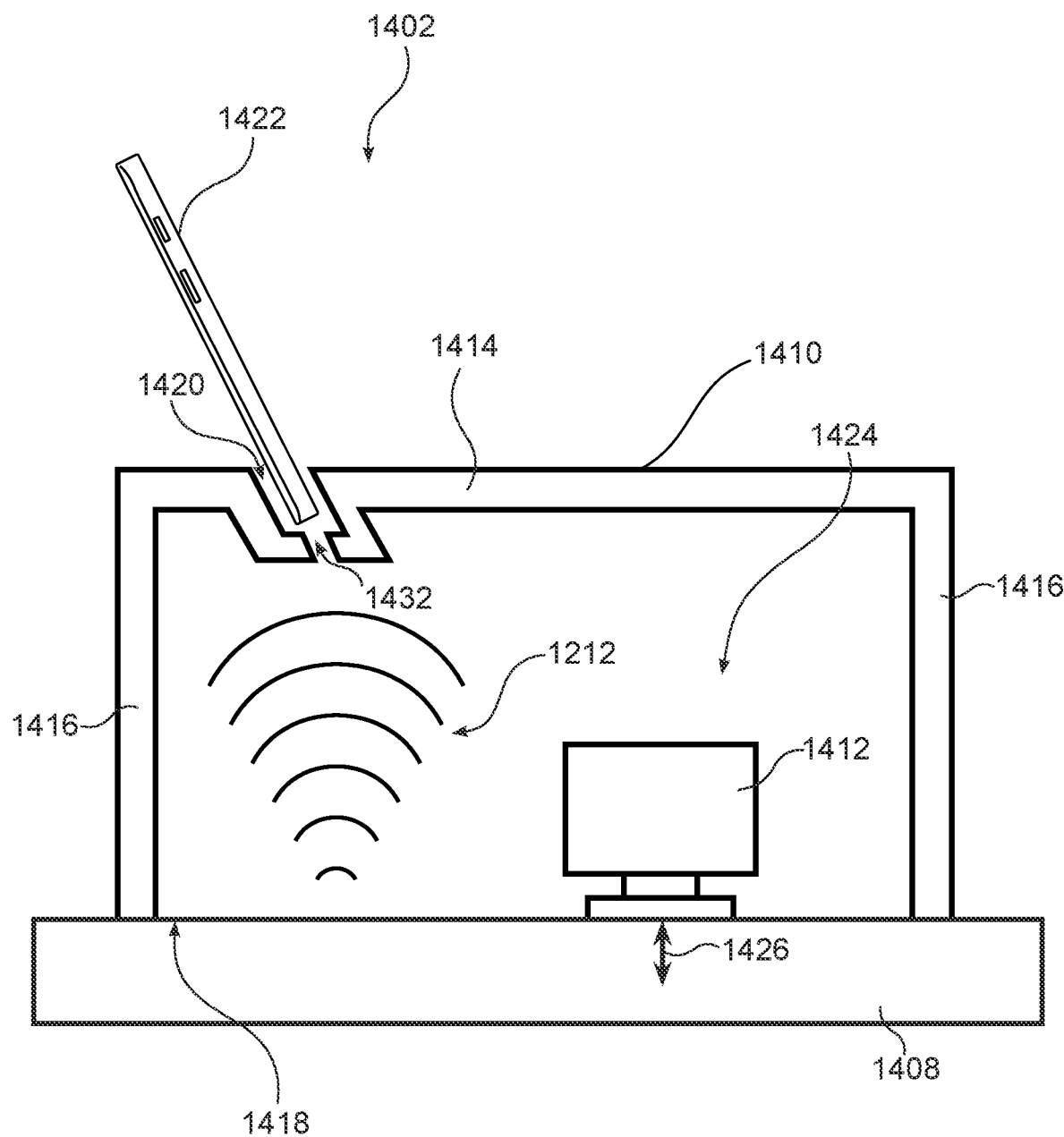
FIG. 14 is a schematic view of another embodiment of an acoustic apparatus.

FIG. 14 shows an acoustic apparatus 1402 according to one embodiment of the present invention being used to determine the composition of a floor 1408. Acoustic apparatus 1402 includes an enclosure 1410 and a surface transducer 1412. Enclosure 1410 has a body portion 1414 and four side walls 1416, only two of which are shown in FIG. 14. Enclosure 1410 includes an open side 1418. Body portion 1414 includes a recess 1420 in which is inserted a smartphone 1422.

As shown in FIG. 14, open side of enclosure 1410 of acoustic apparatus 1402 is placed on floor 1408 to produce an enclosed region 1424 formed by enclosure 1410 and floor 1408. In one embodiment of the present invention, enclosed region 1424 is acoustically isolated from environment 1428 outside enclosed region 1424. Surface transducer 1412 of acoustic apparatus 1402 on floor 1408 transmits vibrations, indicated by double-headed arrow 1426, into floor 1408 to vibrate floor 1408 to thereby cause floor 1408 to produce filtered sound waves 1430. Filtered sound waves 1430 pass through an opening 1432 in recess 1420 and are received by a microphone (not shown in FIG. 14) of smartphone 1422.

The type of material floor 1408 is made of will affect what type of filtered sound waves are produced by floor 1408 in response to the vibrations transmitted to the floor 1408 by surface transducer 1412. For example, some materials used in floor 1408 will tend to better transmit lower frequency sound waves in filtered sound waves 1430, Conversely, harder material used in floor 1408 will tend to better transmit higher frequency sound waves in filtered sound waves 1430. Based on stored sound wave profile information about different types of flooring materials in the memory of smartphone 1422, the amplitude in the vibrations transmitted by surface transducer 1412 into floor 1408 and the amplitude of each frequency in filtered sound waves 1430, hardware and/or software in smartphone 1422 determines the composition of floor 1408. The operation of surface transducer 1412 may be controlled by smartphone 1422 via a wireless or a wired connection (not shown in FIG. 14).

Figure 16:
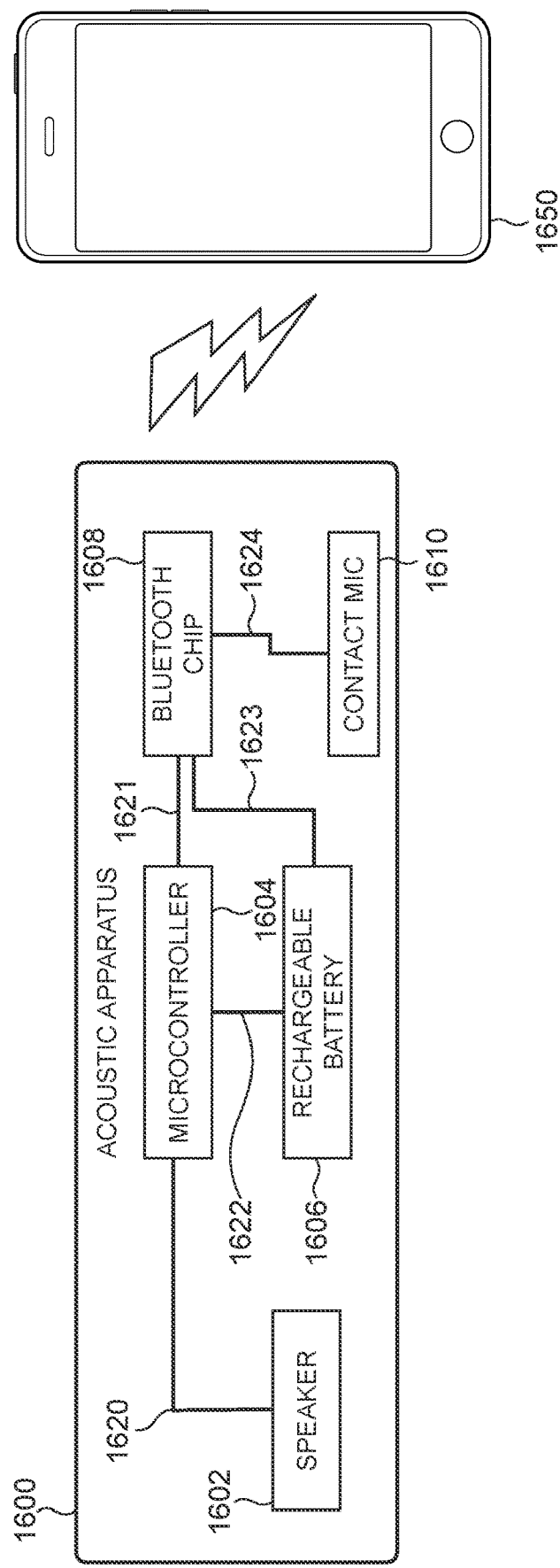
FIG. 16 is a schematic view of another embodiment of an acoustic apparatus.

FIG. 16 is a schematic view of another embodiment of an acoustic apparatus 1600 that is remotely connected to a smartphone 1650. Referring to FIG. 16, acoustic apparatus 1600 includes a speaker (or transducer) 1602 for generating sound waves. Additionally, apparatus 1600 includes contact microphone 1610. When using a contact microphone, which will not pickup significant ambient noise, a second microphone for detecting ambient noise may not be necessary.

Speaker 1602 is connected to a microcontroller 1604 via wires 1620. Microcontroller 1604 may include provisions for generating sounds that can be played by speaker 1602. This allows an audio signal to be generated by speaker 1602 without the need for a separate device that can generate sound, such as a smartphone.

Apparatus 1600 may also include a Bluetooth chip 1608 for communicating with smartphone 1650. Bluetooth chip 1608 may receive signals from contact microphone using wires 1624. This allows signals detected by contact microphone 1610 to be sent to smartphone 1650 over Bluetooth chip 1608 for further analysis. In some cases, it is also possible for audio signals sent by smartphone 1650 to Bluetooth chip 1608, to be sent to microcontroller 1604 using wires 1621. For example, audio signals could be sent by smartphone, pass through microcontroller, and end up at speaker 1602. Optionally, instead of a Bluetooth chip, other systems enabling wireless communications between smartphone 1650 and other components of acoustic apparatus 1600 could be used.

Acoustic apparatus 1600 may also include a rechargeable battery 1606 for powering one or more onboard components. In this example, rechargeable battery 1606 powers microcontroller 1604 via wires 1622. Also, rechargeable battery 1606 powers Bluetooth chip 1608 via wires 1623.

The configuration shown in FIG. 16 allows acoustic apparatus 1600 to operate as a self-contained device that can be wirelessly coupled with a smartphone or other computing device. It may be appreciated that in other embodiments, one or more of these components could be optional. Moreover, in other embodiments, elements of the present embodiment could be combined with elements of previous embodiments, including the embodiment shown in FIGS. 1-2.

The enclosure of the present invention may be made of various materials such plastic, rubber, etc. that will not significantly affect the filtered sound waves produced by the surface covering.

In one embodiment of the present invention the distal perimeter edge of the enclosure may have a resilient material such as silicone, rubber or plastic layer coated on the distal perimeter edge of the enclosure, In another embodiment of the present invention, the distal perimeter edge of the enclosure may have a layer of a resilient layer mounted on the distal perimeter edge of the enclosure using an adhesive, screws or other fixing means. The resilient layer may be made of felt, plastic, rubber, etc.

Although in the embodiments of the present invention shown in the drawings and described above the acoustic apparatus is shown being used to determine the composition of a flooring material, the acoustic apparatus of the present invention may also be used to identify the materials used in other types of surface coverings such as walls, ceilings and roofs. When used to identify the materials used surface coverings such as walls, ceilings and roofs, the enclosure may be held in place on the surface covering manually or may include suction cups or other means to hold the enclosure in place a vertical or upside down position on the surface covering.

When used to identify the materials used surface coverings such as walls, ceilings and roofs, the surface transducer may be mounted in a case including suction cups or other means to hold the surface transducer in place a vertical or upside down position on the surface covering.

Although in the embodiments of the present invention shown in the drawings and described above, the enclosure has the shape of a rectangular box with two short sides and two long sides, the enclosure of the present invention could have a square-shaped body portion with all of the sides being the same length. Also, although in the embodiments of the present invention shown in the drawings and described above, the enclosure has the shape of an open rectangular box, an enclosure of the present invention may have various different shapes. For example, the enclosure could be in the shape of an open disc-shaped cylinder, in which case the body portion would be circular in shape with a single cylindrical wall extending from the body portion. In other embodiments of the present invention the enclosure could have: a triangular body portion and three side walls, a pentagonal body portion with five side walls, a hexagonal body portion with six side walls, etc.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. An acoustic apparatus comprising:
   a housing portion including an upper portion and a lower portion;
   a transducer mounted adjacent the lower portion;
   a first microphone mounted adjacent the lower portion;
   an electrical connector configured to be connected to a computing device;
   the electrical connector being electrically connected to the first microphone; and
   wherein when the acoustic apparatus is placed against a floor and the transducer is activated, the transducer generates sound waves comprising a plurality of frequencies that are generated above, directed into, and travel through the floor generating filtered sound waves that can be detected by the first microphone and wherein based on stored sound wave profile information about different types of flooring material and a first amplitude of each frequency in the sound waves transmitted by the transducer into the floor and a second amplitude of each frequency in the filtered sounds waves the acoustic apparatus determines a composition of the floor.

2. The acoustic apparatus according to claim 1, wherein the electrical connector is a lightning connector.

3. The acoustic apparatus according to claim 1, wherein the electrical connector is a micro-USB connector.

4. The acoustic apparatus according to claim 1, wherein the acoustic apparatus includes a second microphone mounted to the housing portion at a location disposed away from the first microphone, wherein the second microphone is electrically connected to the electrical connector, and wherein the second microphone is configured to detect ambient sound.

5. The acoustic apparatus according to claim 1, wherein the housing portion includes a cavity with a curved wall to receive the transducer.

6. The acoustic apparatus according to claim 1, wherein the lower portion includes a first opening and a second opening, wherein the transducer is visible through the first opening and wherein the first microphone is visible through the second opening.

7. The acoustic apparatus according to claim 1, wherein the housing portion includes a cavity to receive a portion of the computing device.

8. The acoustic apparatus according to claim 1, wherein the acoustic apparatus includes an audio jack electrically connected to the transducer, and wherein the audio jack is configured to be connected to an audio source.

9. The acoustic apparatus according to claim 8, wherein the audio source is the computing device.

10. An acoustic apparatus comprising:
    a housing portion including an upper portion and a lower portion;
    a transducer mounted with the housing;
    a first microphone mounted with the housing; and
    an electrical connector configured to be connected to a mobile computing device;
    wherein the electrical connector is electrically connected to the first microphone and when the lower portion of the acoustic apparatus is placed against a floor with the first microphone oriented to pick up sounds from the floor and the transducer is activated, the transducer generates sound waves comprising a plurality of frequencies that are generated above, directed into, and travel through the floor generating filtered sound waves that can be detected by the first microphone and communicated to the mobile computing device, the mobile device uses stored profile information about stored wave profile information and different types of flooring materials and a first amplitude of each frequency in the sound waves transmitted by the transducer into the floor and a second amplitude of each frequency in the filtered sound waves to determine a composition of the floor.

11. The acoustic apparatus of claim 10, wherein the mobile computing device comprises a smartphone.

12. The acoustic apparatus of claim 11, wherein the transducer comprises a speaker in the smartphone.

13. The acoustic apparatus of claim 10, wherein the first microphone comprises a contact microphone.

14. The acoustic apparatus of claim 10, wherein sounds in the floor can be communicated to a signal processing module running on the mobile computing device to generate a processed signal.

15. The acoustic apparatus of claim 14, wherein:
    the acoustic apparatus further comprises a second microphone to detect ambient noise;
    ambient noise detected by the second microphone can be communicated to the signal processing module on the mobile computing device;
    the signal processing module can remove the detected ambient noise from sounds in the floor communication to the signal processing module to generate the processed signal; and
    the processed signal can be communicated to a flooring type classifier running on the mobile computing device.

* * * * *